United States Patent Office 2,830,981
Patented Apr. 15, 1958

2,830,981
COMPLEX HEAVY METAL COMPOUNDS

Jean-Pierre Jung, Riehen, near Basel, Switzerland, assignor to J. R. Geigy A.-G., Basel, Switzerland, a Swiss firm No Drawing. Application June 18, 1956
Serial No. 591,806

Claims priority, application Switzerland July 7, 1955

7 Claims. (Cl. 260—147)

The invention concerns metallisable monoazo dyestuffs as well as the complex heavy metal compounds thereof. It also concerns processes for the production of these compounds as well as their use for the fast dyeing of natural and synthetic polypeptide fibres. Further, it concerns, as industrial product, the polypeptide material fast-dyed by the use of the new dyestuffs.

Metallisable dyestuffs which are produced by using diazotised o-hydroxyamino benzaldehydes have not been known up to now. It has now been found that valuable metallisable monoazo dyestuffs are obtained which can be converted by methods known per se in substance or on the fibre into very fast heavy metal complexes if a diazotised o-hydroxyamino benzaldehyde which can be further substituted in the benzene ring is coupled with an azo component coupling in neighbouring position to a metallisable group. According to their composition, the new monoazo dyestuffs dye natural or synthetic polypeptide fibres, in particular wool, in a neutral to acid bath in the presence of or on aftertreatment with chromic acid alkali salts in orange, red, brown to grey shades, most of which are very fast to light. The complex heavy metal compounds, in particular the complex chromium and cobalt compounds of unsulphonated monoazo dyestuffs according to the present invention which also contain no carboxyl groups not taking part in the metal complex formation, are suitable for the dyeing of wool, silk, leather and synthetic polyamide and polyurethane fibres in yellow, orange, red, brown to grey shades from a neutral to weakly acid bath.

Some of the o-hydroxyamino benzaldehydes usable in the process according to the present invention are known, others can be produced by known methods from known starting materials. 4-hydroxy-3-amino benzaldehyde is known and can be used direct in the process according to the present invention; the following can be obtained therefrom and used in the process according to the present invention: 4-hydroxy-3-amino benzaldehyde-5-sulphonic acid (obtained by sulphonation), 5-nitro-4-hydroxy-3-amino benzaldehyde (obtained by acetylation, nitration and saponification of the acetylamino group to the amino group), 5-acetylamino- or 5-methyl sulphonyl amino-4-hydroxy-3-amino benzaldehyde (obtained by acetylating, nitrating and reducing the nitro group to the amino group). Further examples are 3-amino-2-hydroxy benzaldehyde (obtained from the known 3-nitro-2-hydroxybenzaldehyde by reduction of the nitro group to the amino group), 3-amino-2-hydroxy benzaldehyde-5-sulphonic acid (obtained by sulphonating the last named compound), 5-amino-4-hydroxy-2-chlorobenzaldehyde (obtained by reduction of the corresponding nitroaldehyde which is known), 4-amino-3-hydroxybenzaldehyde (obtained by reduction from the corresponding nitroaldehyde which is known), 5-methyl-4-hydroxy-3-aminobenzaldehyde (obtained from the known 5-methyl-4-hydroxy-3-nitrobenzaldehyde by reduction of the nitro group to the amino group) and 5-chloro-4-hydroxy-3-aminobenzaldehyde (obtained from o-chlorophenol and chloroform whilst nitrating and reducing the nitro group to the amino group analogous to the last mentioned compound). Thus the o-hydroxyamino benzaldehydes usable according to the present invention can be further substituted in the benzene ring by the substituents usual in azo dyestuffs, e. g. by halogen, alkyl, nitro, acylamino and sulphonic acid groups.

All coupling components usual in chromable or metal containing azo dyestuffs which couple in the neighbouring position to a metallisable group are used as azo components. Examples are: acyl acetic acid arylamides, 5-pyrazolones, 2.4-dihydroxyquinolines, p-alkyl phenols, naphthalene compounds coupling in o-position to a hydroxyl or amino group etc. Acylamino naphthols and acylamino naphthol sulphonic acids are particularly valuable azo components for the production of grey dyestuffs according to the present invention which are fast to light.

In the process according to the present invention, when producing acid after-chroming dyestuffs, in general either sulphonated diazo components are coupled with unsulphonated azo components or unsulphonated diazo components are coupled with sulphonated azo components.

Particularly valuable however for the dyeing of polypeptide fibres from a neutral to weakly acid bath are those dyestuffs according to the present invention containing heavy metal in complex linkage in particular the complex chromium and cobalt compounds, which contain no salt forming, water solubilising groups which dissociate acid in neutral water such as sulphonic acid groups, or no carboxyl groups not taking part in the complex formation. The unsulphonated azo components of these dyestuffs having no carboxyl groups can also contain for example halogen, alkyl, alkoxy, acylamino or sulphonic acid amide groups apart from the group capable of forming the metal complex. As examples can be named: acetacetic acid phenylamides, 1-phenyl-3-methyl-5-pyrazolones, p-alkyl phenols, such as 3,4-dimethyl phenol, 4-methyl-2-acylamino phenols, naphthols such as 2-hydroxynaphthalene, 4.8-dichloro-1-hydroxynaphthalene, 1-hydroxynaphthalene-3-sulphonic acid amides and 1-hydroxynaphthalene-3.6- or -3.8-disulphonic acid amides which can also contain low organic hydrocarbon radicals preferably at the amide nitrogen atom, 6- or 7-alkoxy-2-hydroxynaphthalenes and in particular, the 1-acylamino-7-hydroxynaphthalenes, e. g. 1-acetylamino, 1-carbethoxyamino, 1-methyl sulphonyl amino, 1-$\beta$-chlorethyl sulphonylamino and 1-p-toluene sulphonylamino-7-hydroxynaphthalene which produce particularly valuable grey, metal containing dyestuffs. Combined with 4-hydroxy-3-amino benzaldehydes, these 1-acylamino-7-hydroxynaphthalenes produce the most valuable and preferred chromium or cobalt containing dyestuffs according to the present invention.

It is surprising and could not have been foreseen that the aromatically bound formyl group in the phenolic diazo component of unsulphonated metal containing dyestuffs would give sufficient water solubility for practical dyeing purposes because up to now alkyl sulphonyl or sulphonic acid amide groups containing hexavalent sulphur have always been used for this purpose.

The unsulphonated, metal containing dyestuffs according to the present invention contain preferably 2 molecules of organic complex-former, of which at least one and, preferably, both are monoazo dyestuffs according to the present invention, co-ordinated to one heavy metal atom. Also another o,o'-dihydroxy azo dyestuff may possibly be used as second organic complex-former which dyestuff can contain preferably a sulphonic acid amide or an alkyl sulphonyl group as a group for increasing the water solubility, or also a colourless aromatic o-hydroxycarboxylic acid may be used which can contain the same water solubility-increasing substituents.

The unsulphonated chromium and cobalt containing dyestuffs according to the present invention are obtained by methods known per se by reacting the ordinary or complex salts of these metals, e. g. chromosalicylic acid alkali salts, chromic acetate, cobalt acetate, cobalt chloride, cobalt sulphate or hexammine cobaltitrichloride, with aqueous solutions or suspensions of the metal-free dyestuffs or dyestuff mixtures, the metallisation being performed in a neutral to alkaline medium in the warm. Also, the complex chromium compounds which contain one chromium atom per dyestuff molecule and which are obtained by methods known per se in organic solution, e. g. in ethylene glycol, with excess chromic salts, can be reacted with unsulphonated o,o'-dihydroxy azo dyestuffs containing no metal or with organic uncoloured complex-formers such as e. g. aromatic o-hydroxycarboxylic acids. In this case, when using at least one mol of a dyestuff according to the present invention per metal atom, also new metal containing dyestuffs according to the invention are obtained.

It is of advantage to convert these new chromium and cobalt containing unsulphonated dyestuffs before use into their alkali salts, e. g. into the lithium, sodium, potassium or ammonium salts. This is done by either performing the metallisation in the presence of the corresponding hydroxides or of salts of these alkalies having an alkaline reaction, e. g. in the presence of the carbonates or triphosphates, or by mixing the completely formed, dry products with salts having an alkaline reaction. Also the addition of organic, anion active wetting and dispersing agents, e. g. of formaldehyde condensation products of polynuclear aromatic sulphonic acids has an advantageous effect on the dyeing behaviour of the new metal containing dyestuffs.

According to their composition, the new metallisable azo dyestuffs dye natural and synthetic polypeptide fibres and in particular wool in a neutral to weakly acid or in a strongly acid bath in the presence of or on after-treatment with chromic acid alkali salts in orange, red, brown to grey shades which are fast to wet and light.

The particularly valuable new, heavy metal containing dyestuffs which contain no sulphonic acid groups and no carboxyl groups not taking part in the complex formation, are particularly suitable for the fast dyeing of wool, silk and synthetic polypeptide fibres in yellow, orange, red, brown to grey shades from a neutral to weakly acid bath.

The following examples illustrate the invention. Where not otherwise stated, parts are given as parts by weight. The temperatures are given in degrees centigrade. The relationship of parts by weight to parts by volume is that of kilogrammes to litres.

EXAMPLE 1

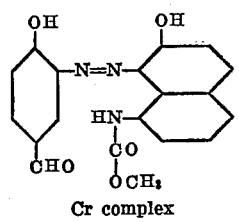

Cr complex 13.7 parts of 3-amino-4-hydroxybenzaldehyde are dissolved in 100 parts of water with 25 parts of concentrated hydrochloric acid and, after cooling to 0–3°, are diazotised with 6.9 parts of sodium nitrite. So much sodium bicarbonate is then added until Congo red paper no longer turns blue. The whole is poured into an ice cold solution of 22.8 parts of 1-carbomethoxyamino-7-hydroxynaphthalene, 4.2 parts of sodium hydroxide and 15 parts of anhydrous sodium carbonate in 300 parts of water and stirred at 0–3° until the dyestuff formation is complete. The dyestuff is then precipitated with sodium chloride, filtered off and dried. It is a dark powder which dyes wool according to the single bath chroming method in very fast, grey shades.

To convert into the complex chromium compound, the dyestuff is stirred in 200 parts of water, heated to 90°, 20 parts of sodium chloride and 220 parts of a solution of sodium chromosalicylate (corresponding to 2.85 parts of chromium) are added and the whole is boiled until the starting dyestuff has disappeared. The chromium compound which precipitates, is filtered off hot, washed with a little diluted sodium chloride solution and dried. A blue-black powder is obtained which dissolves in hot water with a blue-grey colour. It dyes wool from a neutral to weakly acid bath in grey shades which have excellent fastness to light and very good fastness to washing and milling.

A dyestuff of a somewhat more red colour and slightly less drawing power from a neutral bath is obtained if in the above example 21.2 parts of 1-acetylamino-7-hydroxynaphthalene are used as coupling component.

EXAMPLE 2

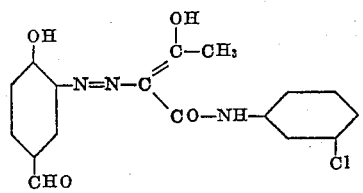

Co complex 13.7 parts of 3-amino-4-hydroxy-1-benzaldehyde are diazotised as described in Example 1 and coupled with 22.3 parts of acetacetic acid-3'-chlorophenylamide. The dried dyestuff is pasted in 300 parts of water and 100 parts of a solution of cobalt acetate (corresponding to 3.25 parts of Co) and a concentrated solution of 25 parts of crystallised tartaric acid are added at 75°. Then a 10% sodium carbonate solution is slowly added dropwise until the reaction is alkaline and the whole is stirred at 75–80° until the metallisation is complete. The precipitated dyestuff is then filtered off and dried. It is a yellow-brown powder which dissolves in hot water with a yellow colour and dyes wool from a neutral to weakly acid bath in yellow shades which have good fastness to light and good fastness to washing and sea water.

If in the above example the same number of parts of acetacetic acid-4'- or -2'-chlorophenylamide are used as coupling component, then dyestuffs of a somewhat more red shade are obtained.

EXAMPLE 3

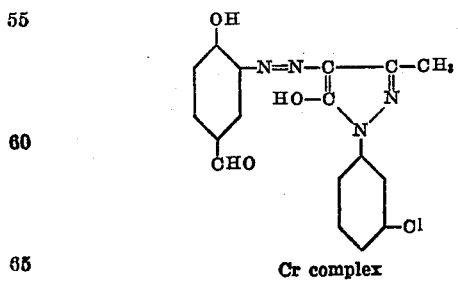

Cr complex 13.7 parts of 3-amino-4-hydroxy-1-benzaldehyde are diazotised as described in Example 1, neutralised and 3 parts of sodium bicarbonate are added. Then a solution of 22 parts of 1-(3'-chlorophenyl)-3-methyl-5-pyrazolone and 4.4 parts of sodium hydroxide in 400 parts of water is slowly poured in. On completion of the coupling, the dyestuff is filtered off, washed with cold water and dried. It is heated at 95–100° in 200 parts of formamide with chromic acetate (corresponding to 2.9 parts of Cr) until the metallisation is complete. The melt is then poured into 1000 parts of hot water, acidified with hydrochloric acid whereupon the chromium containing dyestuff is precipitated. It is filtered off, washed with water, stirred in a cold solution of 4 parts of sodium hydroxide in 200 parts of water for some time until the complex colour acid has been converted into the sodium salt, a little sodium chloride is added, the dyestuff is filtered off and dried. The new chromium complex dyestuff dyes wool from a neutral bath in reddish-orange shades which have very good fastness properties.

If instead of 1-(3'-chlorophenyl)-3-methyl-5-pyrazolone, the same number of parts of 1-(2'-chlorophenyl)-3-methyl-5-pyrazolone are used then a dyestuff which has similar fastness properties but slightly less drawing power from a neutral bath is obtained.

Other valuable dyestuffs produced according to the above process and their dyeings onto wool are given in the following table.

Table

| No. | Diazo component | Coupling component | Metal | Shade on wool |
|---|---|---|---|---|
| 1 | 3-amino-4-hydroxy-1-benzaldehyde. | 3.4-dimethyl-1-phenol. | Cr | brown. |
| 2 | do | do | Co | red-brown. |
| 3 | 5-nitro-3-amino-4-hydroxy-1-benzaldehyde. | do | Co | brown. |
| 4 | do | 1-phenyl-3-methyl-5-pyrazolone. | Cr | scarlet. |
| 5 | 3-amino-4-hydroxy-1-benzaldehyde. | 2-naphthol | Cr | brownish-violet. |
| 6 | do | do | Co | bordeaux red. |
| 7 | do | 5.8-dichloro-1-hydroxynaphthalene. | Cr | navy blue. |
| 8 | do | do | Co | red-violet. |
| 9 | do | 2-acetylamino-4-methyl-1-phenol. | Cr | brown. |
| 10 | 5-methyl-3-amino-4-hydroxy-1-benzaldehyde. | 2-aminonaphthalene. | Co | grey. |
| 11 | do | 6-chloro-2-aminonaphthalene. | Co | Do. |
| 12 | 5-methoxy-3-amino-4-hydroxy-1-benzaldehyde. | 1-phenyl-3-methyl-5-pyrazolone. | Cr | red. |
| 13 | do | 1-acetylamino-7-hydroxynaphthalene. | Cr | grey. |
| 14 | do | 1-carbomethoxyamino-7-hydroxynaphthalene. | Cr | Do. |

EXAMPLE 4

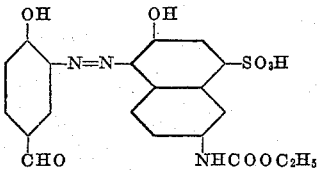

13.7 parts of 3-amino-4-hydroxybenzaldehyde are dissolved in 100 parts of water with 25 parts of concentrated hydrochloric acid, diazotised in the usual way at 0–3° with 6.9 parts of sodium nitrite and added dropwise slowly at 0–5° to a solution of 32.1 parts of 2-carbethoxyamino-6-hydroxynaphthalene-8-sulphonic acid and 20 parts of 25% ammonia water in 300 parts of water and 100 parts of pyridine. On completion of the coupling, the monoazo dyestuff formed is precipitated with sodium chloride, filtered off and dried. It is a dark powder which dissolves in hot water with a blue colour and dyes wool from an acid bath, when afterchromed, in grey shades. The dyeings have very good fastness to light and wet.

In the above example, if 28.7 parts of 2-acetylamino-6-hydroxynaphthalene-8-sulphonic acid or 30.3 parts of 1-carbomethoxyamino-7-hydroxynaphthalene-3-sulphonic acid are used instead of 32.1 parts of 2-carbethoxyamino-6-hydroxynaphthalene-8-sulphonic acid, then monoazo dyestuffs are obtained which have similar good wet fastness properties.

EXAMPLE 5

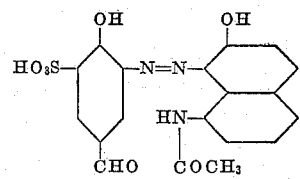

21.7 parts of 3-amino-4-hydroxybenzaldehyde-5-sulphonic acid in the form of the sodium salt are dissolved in 500 parts of water and indirectly diazotised, after the addition of 6.9 parts of sodium nitrite, in the usual way. The diazo solution is then buffered with sodium bicarbonate until Congo red paper is no longer coloured blue, and an ice cold solution of 21.2 parts of 1-acetylamino-7-hydroxynaphthalene, 4.2 parts of sodium hydroxide and 15 parts of anhydrous sodium carbonate in 300 parts of water is poured in. As soon as the dyestuff formation is complete, the dyestuff is precipitated with sodium chloride, isolated and dried. It is a dark powder which dissolves in hot water with a blue colour and dyes wool from an acid bath, when after-chromed and according to the meta-chroming process, in grey shades. The dyeings have very good fastness to wet and light.

A dyestuff with a somewhat more bluish-grey shade and slightly better drawing power from a neutral bath is obtained by replacing the 21.2 parts of 1-acetylamino-7-hydroxynaphthalene by 23.5 parts of 1-carbethoxyamino-7-hydroxynaphthalene.

EXAMPLE 6

0.2 part of the metal containing dyestuff according to Example 1 are dissolved in 400 parts of water. 10 parts of wool are entered at 50°, 0.5 part of ammonium acetate are added, the bath is brought to the boil within 45 minutes and dyeing is performed while moving the wool well for 1½ hours. The goods are then rinsed and dried. The wool which has been dyed in grey shades is distinguished by very good fastness properties.

What I claim is:

1. A metalliferous compound which contains one atom of a metal selected from the group consisting of cobalt and chromium in complex union with two molecules of a monoazo dyestuff of the general formula:

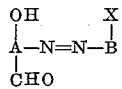

wherein A represents a mononuclear carbocyclic radical of the benzene series containing the azo group in o-position and the formyl group in p-position to the hydroxyl group,

represents the radical of a member selected from the group consisting of phenolic, naphtholic, naphthylaminic and enolic coupling components, and X represents a metallisable group in o-position to the azo group selected from the group consisting of OH and $NH_2$.

2. A metalliferous compound which contains one atom of a metal selected from the group consisting of cobalt and chromium in complex union with two molecules of a monoazo dyestuff which corresponds to the formula:

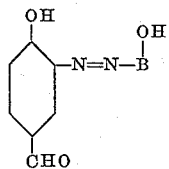

wherein

represents the radical of a naphtholic coupling component which is free from sulphonic acid and carboxylic acid groups and which contains the OH— group in o-position to the azo group.

3. The complex chromium compound which contains one atom of chromium bound in complex union to two molecules of a dyestuff of the formula:

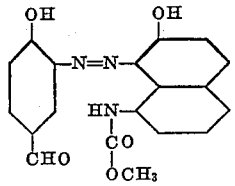

4. The complex chromium compound which contains one atom of chromium bound in complex union to two molecules of a dyestuff of the formula:

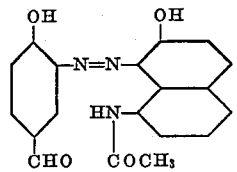

5. The complex cobalt compound which contains one atom of cobalt bound in complex union to two molecules of a dyestuff of the formula:

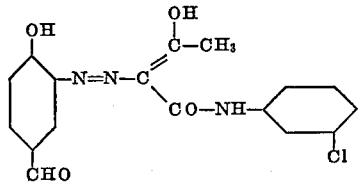

6. The complex chromium compound which contains one atom of chromium bound in complex union to two molecules of a dyestuff of the formula:

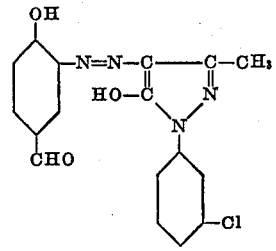

7. The complex cobalt compound which contains one atom of cobalt bound in complex union to two molecules of a dyestuff of the formula:

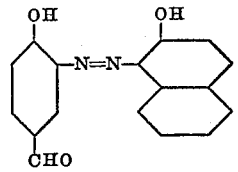

References Cited in the file of this patent

UNITED STATES PATENTS

| | | |
|---|---|---|
| 2,538,568 | Kaiser et al. | Jan. 16, 1951 |
| 2,602,722 | Widmer et al. | July 8, 1952 |

OTHER REFERENCES

Khotinsky et al.: Ber. Deut. Chem., vol. 42, p. 3101 (1909).

Dutt: Jour. Chem. Soc. (London), 1926, pp. 1172–3.